Sept. 20, 1966 E. A. HEINSEN 3,274,501
VOLTAGE TO FREQUENCY CONVERTER
Filed Jan. 3, 1964
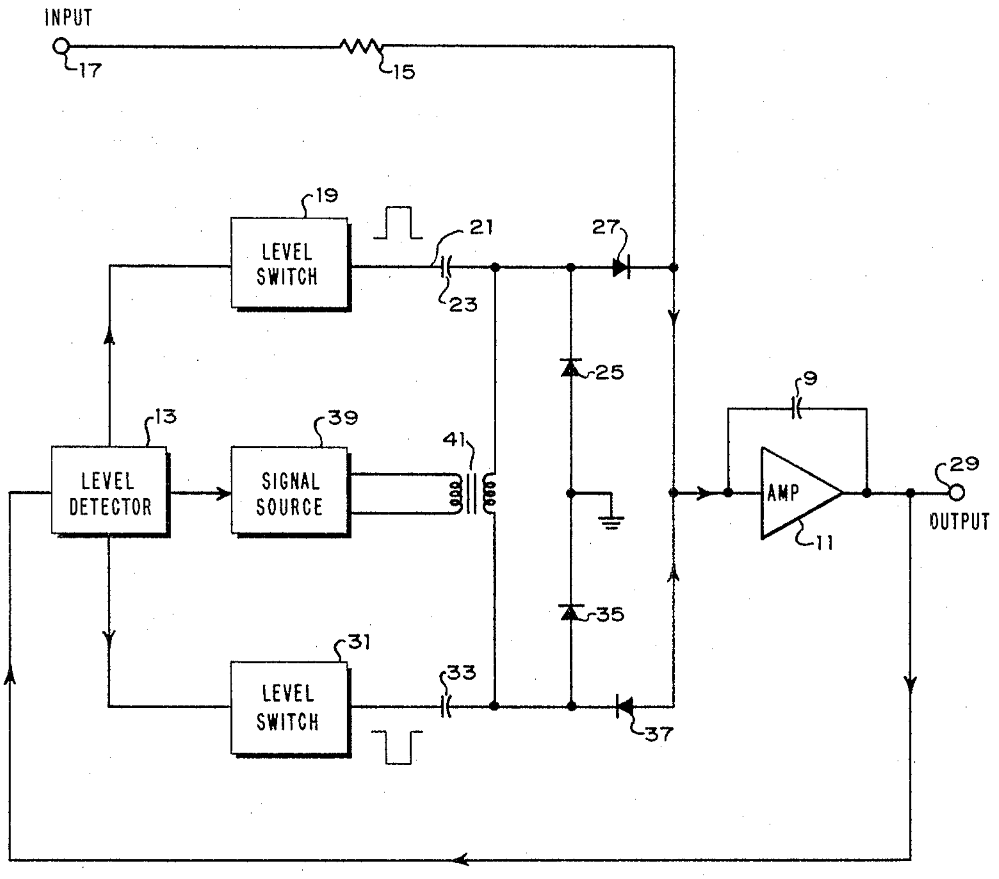
INVENTOR
EDWARD A. HEINSEN
BY A. C. Smith
AGENT 3,274,501
Patented Sept. 20, 1966

3,274,501

VOLTAGE TO FREQUENCY CONVERTER

Edward A. Heinsen, Sunnyvale, Calif., assignor to Hewlett-Packard Company, Palo Alto, Calif., a corporation of California Filed Jan. 3, 1964, Ser. No. 335,540
4 Claims. (Cl. 328—127)

This invention relates to voltage to frequency converters.

It is an object of the present invention to provide a circuit which rapidly transfers charge between a storage capacitor and an integrator.

It is another object of the present invention to provide a circuit including commutating diodes which provide separate high conductivity charge and discharge paths for the storage capacitor of a voltage to frequency converter.

In accordance with the illustrated embodiment of the present invention separate high conductivity charge and discharge paths for the storage capacitor of a voltage to frequency converter are provided by supplying a signal current through the charge-path diodes during the time charging current flows in the path. A signal current is also supplied through the discharge-path diodes during the time discharge current flows in the path. The additional signal currents maintain the diodes in the highly conductive region despite exponentially decaying charge and discharge currents through the diodes, thereby decreasing the charge and discharge time of the storage capacitor.

Other and incidental objects of the present invention will be apparent from a reading of this specification and an inspection of the accompanying drawing which shows a schematic diagram of one embodiment of the invention.

In the drawing, capacitor 9 and amplifier 11 comprise an integrator, the output of which is connected to level detector 13. In operation, the integrator produces a signal at its output which varies from an initial value as the integral with time of the current supplied through resistor 15 from the input signal at terminal 17. When this output of one polarity attains a level determined by level detector 13, it triggers level switch 19 which elevates terminal 21 of storage capacitor 23 to a selected voltage level and then returns it to the initial level. This produces a flow of charging current through diode 27 into the integrator and then a flow of discharging current through diode 25. This adds a fixed charge to the integrator capacitor 9 and causes the integrator output to drop toward its initial value. The output of the integrator again increases with time from this initial value as the integral of the current applied to its input. This process repeats to produce a sawtooth output at terminal 29. Level detector 13 responds to the polarity of the output of the integrator to trigger the proper charge storage channel. Thus, the other storage channel including level switch 31, storage capacitor 33 and diodes 25, 37 is triggered by level detector 13 to operate in a similar manner for signals of opposite polarity appearing at the output of the integrator.

When the signal of either polarity at the output of the integrator attains the desired value, level detector 13 triggers signal source 39 in addition to triggering the proper storage channel. Signal source 39 and transformer 41 supply signal current in one direction through the serially-connected charging diodes 27 and 37 to maintain them in the high conductivity region despite the exponentially decaying charging current to capacitor 23 or 33. This signal current supplied by signal source 39 and transformer 41 reverses direction and flows in diodes 25 and 35 at the same time that charge is being transferred from the storage capacitor 23 or 33 to the integrator. The diodes are thus maintained in the highly conductive state over the entire charging and discharging period, thereby decreasing the time required to complete a charge-transfer cycle. Operating delay usually attributable to increasing diode resistance as charging or discharging currents decrease is thus eliminated. If the diodes in the charging paths are matched and the diodes in the discharging paths are matched and capacitors 23 and 33 are of equal value then the voltage drops across the diodes due to the signal current cancel out and have no effect on the integrating process. Also, commutating diodes connected in this manner reduce the effect of temperature-dependent voltage drops upon the integrating process.

I claim:

1. Signal apparatus comprising:

an integrator having an input and an output;

a capacitor;

circuit means connecting the output of said integrator and one terminal of said capacitor for varying the voltage on said one terminal from a first level to another level and back to said first level in response to the output of said integrator attaining a predetermined value;

unidirectional conduction elements connected to the other terminal of said capacitor poled to conduct separately the charging and discharging currents of said capacitor;

a source of current connected to the common connection of said elements for supplying current through one of said elements during charging of said capacitor and through the other of said elements during discharge of said capacitor; and means including one of said elements coupling the other terminal of said capacitor and the input of said integrator.

2. Signal apparatus as in claim 1 wherein:

said source of current supplies current in the forward direction through said one of the elements substantially only during charging of the capacitor and in the forward direction through the other of said elements substantially only during discharge of said capacitor.

3. Signal apparatus comprising:

an integrator having an input and an output;

first and second capacitors;

circuit means connecting the output of said integrator and one terminal of each of said first and second capacitors for varying the voltage on said one terminal of one of said first and second capacitors from a first level to another level and back to said first level in response to the output of said integrator of a selected polarity attaining a predetermined value;

first and second pairs of unidirectional conduction elements serially connected between the other terminals of said first and second capacitors;

a source of current connected to said elements for supplying forward conduction current through the first pair of said elements during charging of one of said first and second capacitors and through the second pair of said elements during discharge of said one of the first and second capacitors; and means including said first pair of elements coupling the other terminals of said first and second capacitors and the input of said integrator.

4. Apparatus as in claim 3 wherein said source of current includes a signal source and a transformer having a primary winding connected to said signal source and a secondary winding connected across the ends of said first and second pairs of serially-connected unidirectional conduction elements; and said circuit means is connected to said signal source for triggering same to supply said forward conduction current through said transformer in response to the output of said integrator attaining said predetermined value.

References Cited by the Examiner

UNITED STATES PATENTS

| | | | |
|---|---|---|---|
| 2,918,574 | 12/1959 | Gimpel et al. | 328—127 X |
| 3,219,940 | 11/1965 | Cooke-Yarborough | 328—127 X |

ARTHUR GAUSS, *Primary Examiner.*

D. D. FORRER, *Assistant Examiner.*